(12) United States Patent
Liu

(10) Patent No.: US 8,439,391 B1
(45) Date of Patent: May 14, 2013

(54) BABY JOGGER

(76) Inventor: Cheh-Kang Liu, Taipei (TW)

( * ) Notice: Subject to any disclaimer, the term of this patent is extended or adjusted under 35 U.S.C. 154(b) by 157 days.

(21) Appl. No.: 13/164,003

(22) Filed: Jun. 20, 2011

(51) Int. Cl.
*B62B 7/08* (2006.01)

(52) U.S. Cl.
USPC .......................................... 280/650; 280/62

(58) Field of Classification Search .................. 280/38, 280/642, 643, 647, 650, 657, 658, 47.38, 280/62; 16/30, 38
See application file for complete search history.

(56) References Cited

U.S. PATENT DOCUMENTS

| | | | | |
|---|---|---|---|---|
| 4,491,335 | A * | 1/1985 | Evron ........................ | 280/47.41 |
| 5,863,061 | A * | 1/1999 | Ziegler et al. ................ | 280/642 |
| 6,302,613 | B1 * | 10/2001 | Lan ............................. | 403/102 |
| 6,402,166 | B1 * | 6/2002 | Chiu ......................... | 280/47.38 |
| 6,779,804 | B1 * | 8/2004 | Liu ............................. | 280/47.38 |
| 7,048,296 | B1 * | 5/2006 | Wu ............................. | 280/651 |
| 7,258,353 | B2 * | 8/2007 | Liao ........................... | 280/47.38 |
| 2005/0098981 | A1 * | 5/2005 | Chang ......................... | 280/642 |
| 2009/0008907 | A1 * | 1/2009 | Huang ......................... | 280/642 |
| 2011/0084467 | A1 * | 4/2011 | Liao ............................ | 280/642 |

\* cited by examiner

*Primary Examiner* — Frank Vanaman
(74) *Attorney, Agent, or Firm* — Jackson IPG PLLC

(57) ABSTRACT

A baby jogger includes an upper frame unit, two coupling members, two stop members, two rear frame bars, a rear wheel axle, a plurality of rear wheels, two linking devices, two side bars, a lower frame unit, a mud fender, a front wheel frame and a front wheel. The front wall of each coupling member is connected between the two sidewalls thereof; the rotary members at the two distal ends of the lower frame unit are respectively accommodated in the accommodation space in the two coupling members; the two distal ends of the U-shaped handlebar of the upper frame unit are respectively accommodated in the locating hole in each of the two coupling members. This arrangement avoids accidental finger jam when collapsing the upper frame unit and the lower frame unit, assuring a high level of safety.

3 Claims, 14 Drawing Sheets

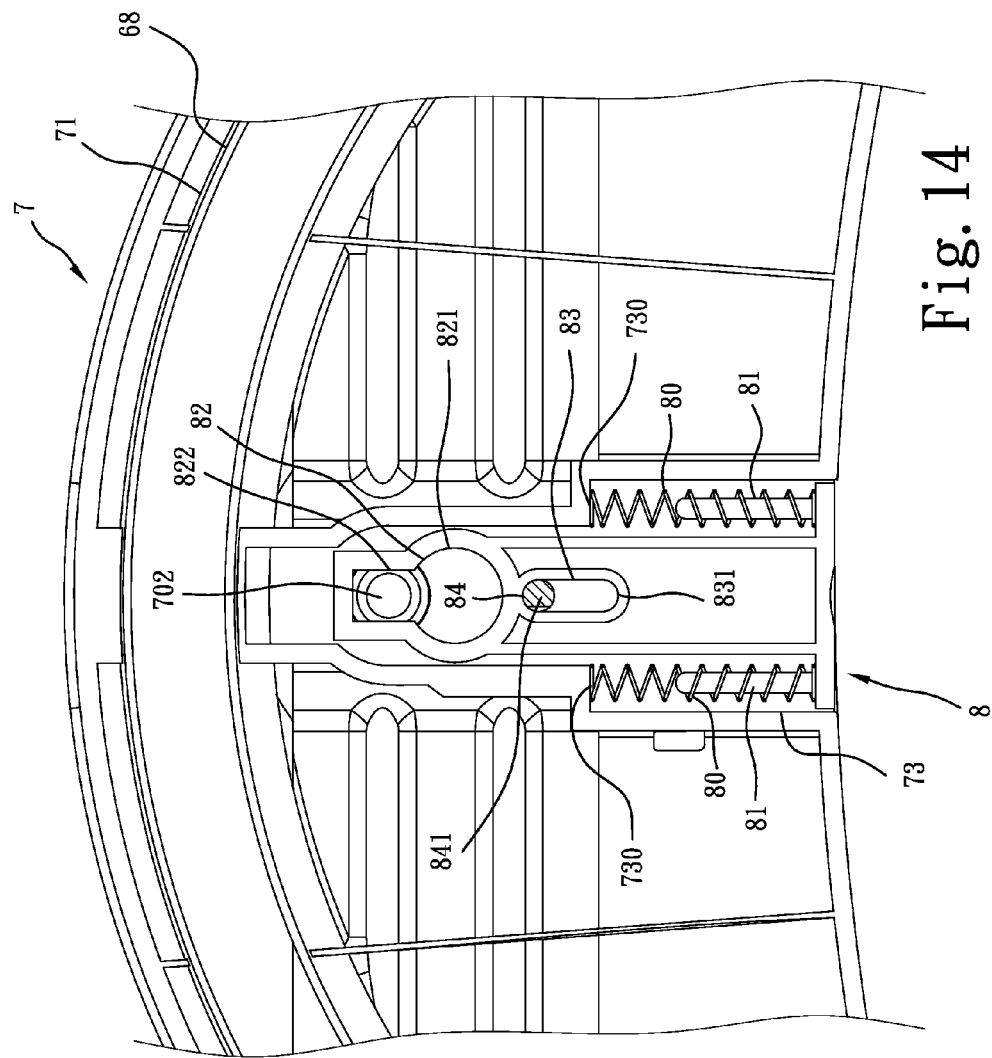

US 8,439,391 B1

BABY JOGGER

BACKGROUND OF THE INVENTION

1. Field of the Invention

The present invention relates to baby vehicles and more particularly, to a baby jogger, which facilitates mounting and dismounting of the mud fender without welding, avoids accidental jam injury and assuring a high level of operation safety.

2. Description of the Related Art

A conventional baby jogger 9, as shown in FIG. 1, has a mud fender 92 welded to the bottom end of the base frame 91 thereof, an axle bearing (not shown) mounted in the mud fender 92 for the coupling of an axle 931 of a front wheel holder 93 that pivotally supports a front wheel 94. It is not environmentally friendly to affix the mud fender 92 to the base frame 91 by welding. During welding, a toxic gas will be produced, threatening the operator's health. Further, welding operation requires skill. If a defective product due to poor welding is not discovered during inspection, its use may cause an accident. Further, when dismounting the front wheel holder 93, a special tool must be used to loosen the lock nut 932, complicating the operation. Further, the retaining member 96 and the connection member 97 at each of the two opposite lateral sides of the baby jogger 9 are independent component parts. When going to collapse the baby jogger 9, the retaining member 96 must be pulled away from the associating connection member 97. When a user or young child extends out or folds up the baby jogger 9, the fingers may be jammed in between the retaining member 96 and the top end 910 of the base frame 91 accidentally, causing an injury.

SUMMARY OF THE INVENTION

The present invention has been accomplished under the circumstances in view. It is the main object of the present invention to provide a baby jogger, which assures a high level of safety, avoiding accidental jam injury when the user is extending out of folding up the baby jogger.

To achieve this and other objects of the present invention, a baby jogger comprises an upper frame unit, two coupling members, two stop members, two rear frame bars, a rear wheel axle, a plurality of rear wheels, two linking devices, two side bars, a lower frame unit, a mud fender, a front wheel frame and a front wheel. The front wall of each coupling member is connected between the two sidewalls thereof; the rotary members at the two distal ends of the lower frame unit are respectively accommodated in the accommodation space in each of the two coupling members; the two distal ends of the U-shaped handlebar of the upper frame unit are respectively accommodated in the locating hole in each of the two coupling members. This arrangement avoids accidental finger jam when collapsing the upper frame unit and the lower frame unit, assuring a high level of safety.

Further, the mud fender is detachably mounted with the coupling groove thereof to the lower frame unit and affixed thereto with the fastening members, and a control member is mounted with the spring members in the rear opening of the mud fender and pivotally secured thereto by the pivot pin for releasably locking the front wheel frame to the mud fender, facilitating installation, saving much installation labor and time and eliminating any welding technique.

Further, subject to the mounting arrangement of the mud fender, the control member, the spring member and the fastening members, the front wheel frame can be fastened to or dismounted from the mud fender conveniently.

BRIEF DESCRIPTION OF THE DRAWING

FIG. 14 is a sectional plain view of a part of the present invention, illustrating the arrangement of the control member and the mounting axle of the front wheel frame in the mud fender.

DETAILED DESCRIPTION OF THE INVENTION

Figure 1:
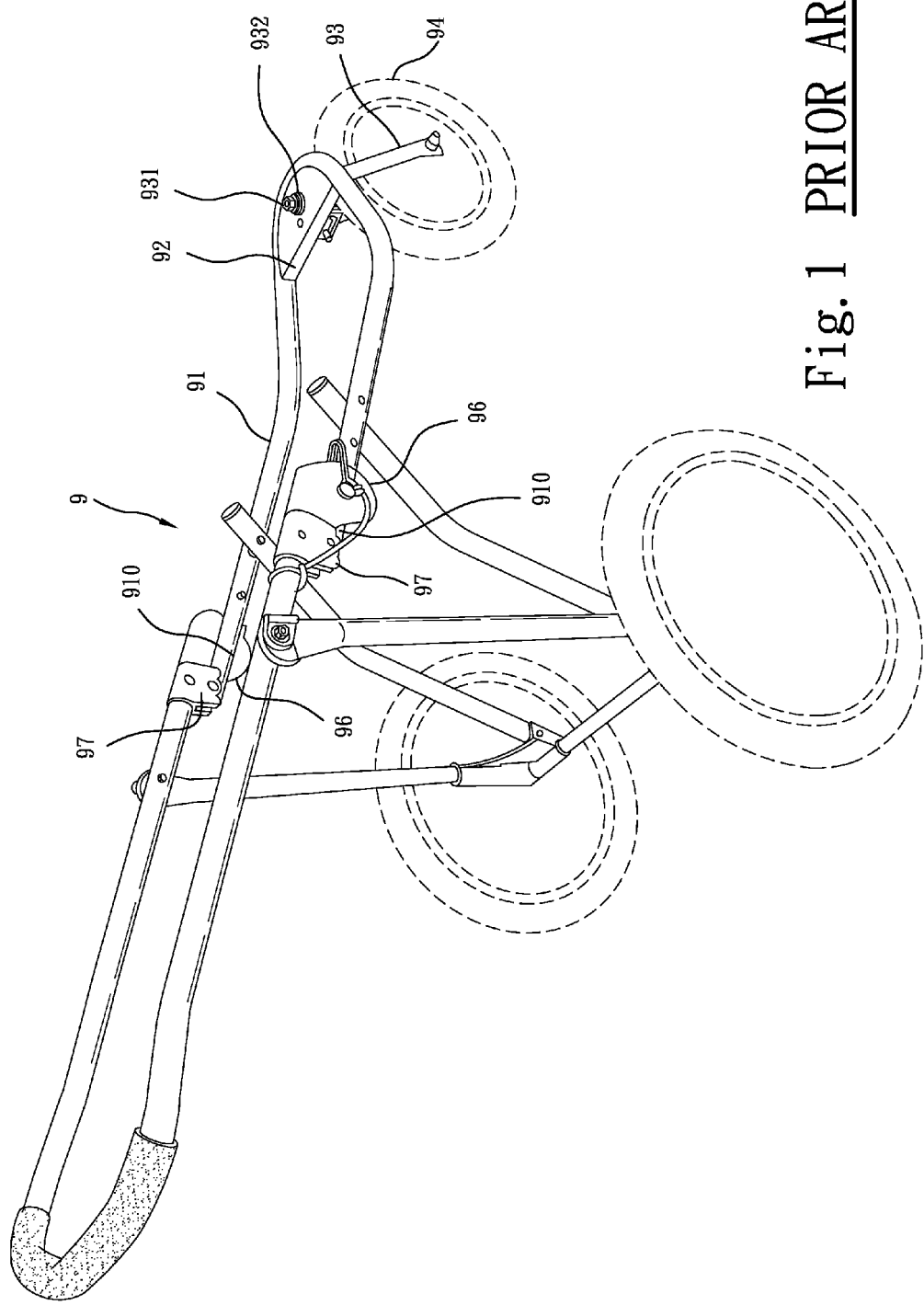
FIG. 1 is an elevational view illustrating the frame structure of a baby jogger according to the prior art.
Figure 2:
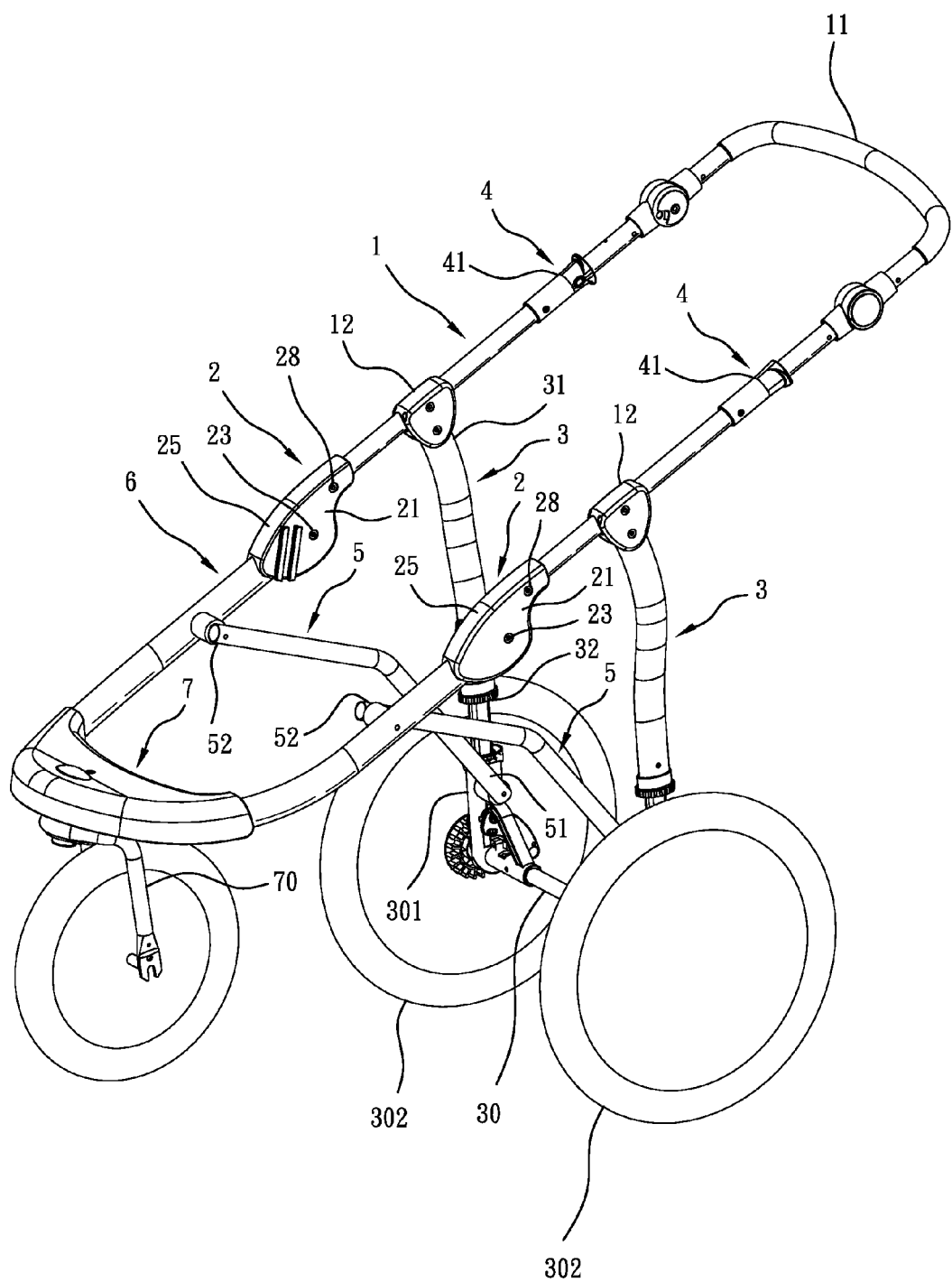
FIG. 2 is an elevational view illustrating the frame structure of a baby jogger in accordance with the present invention.
Figure 3:
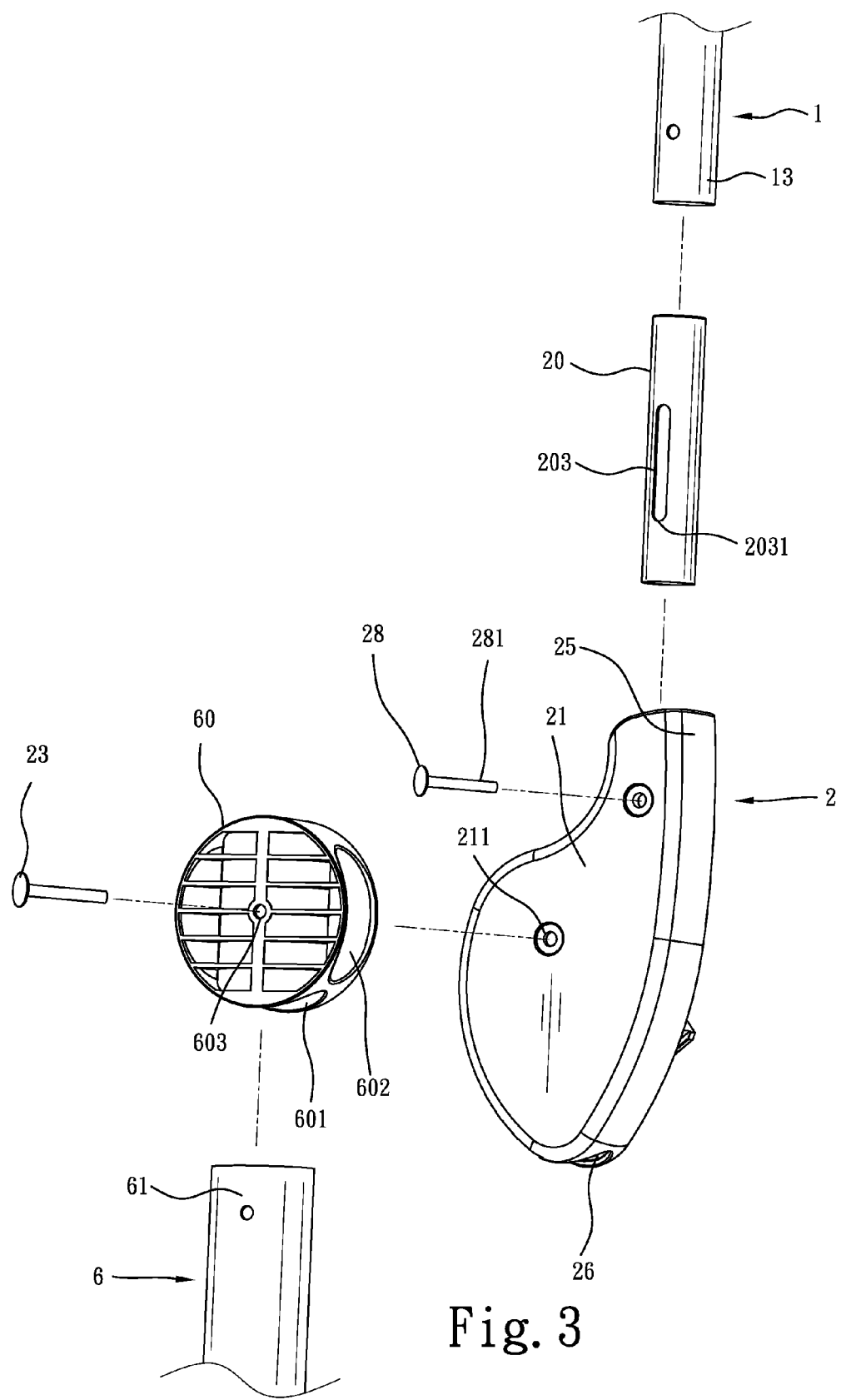
FIG. 3 is an exploded view in an enlarged scale of a part of the baby jogger in accordance with the present invention.
Figure 4:
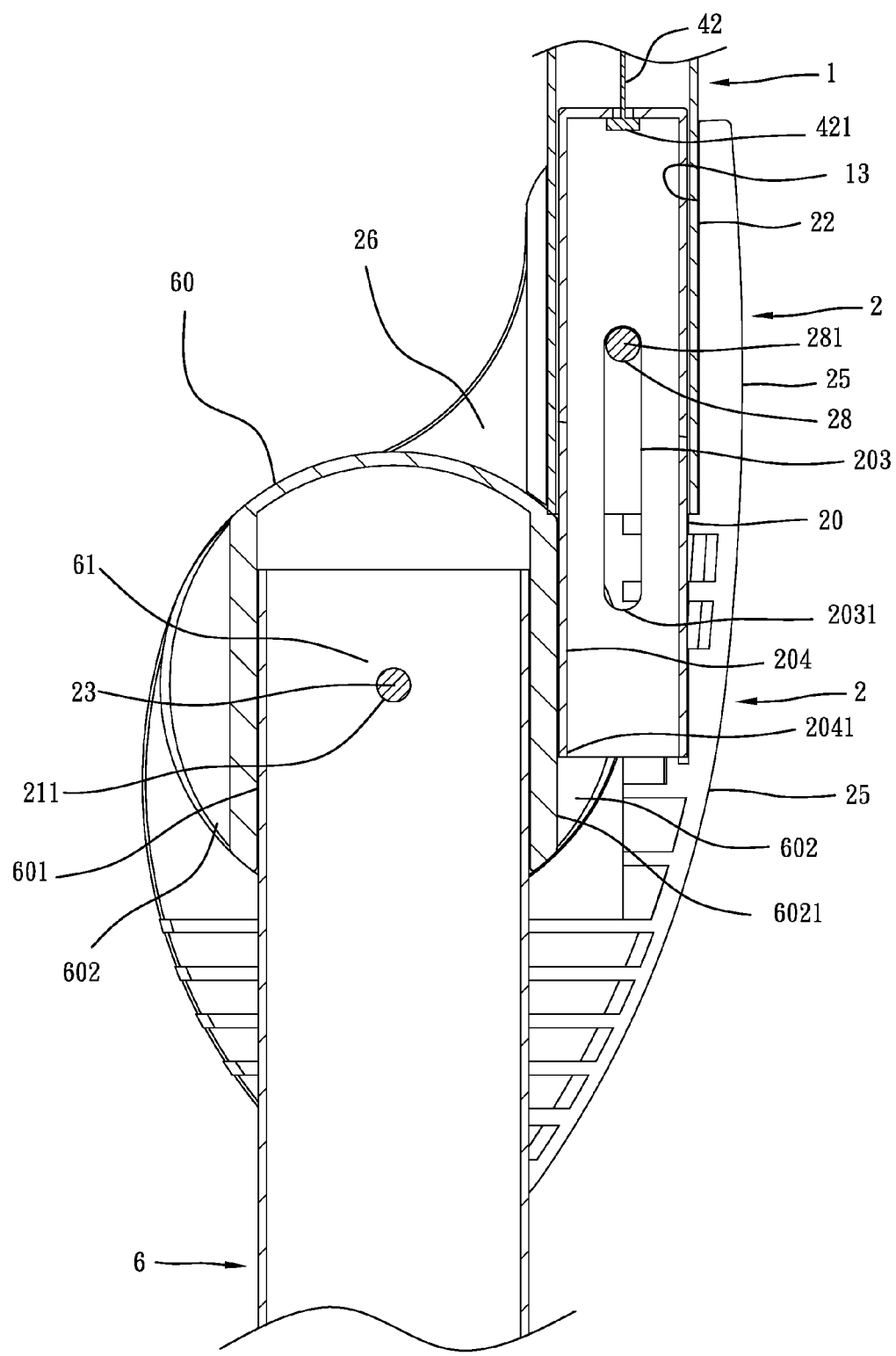
FIG. 4 is sectional assembly view of FIG. 3.
Figure 5:
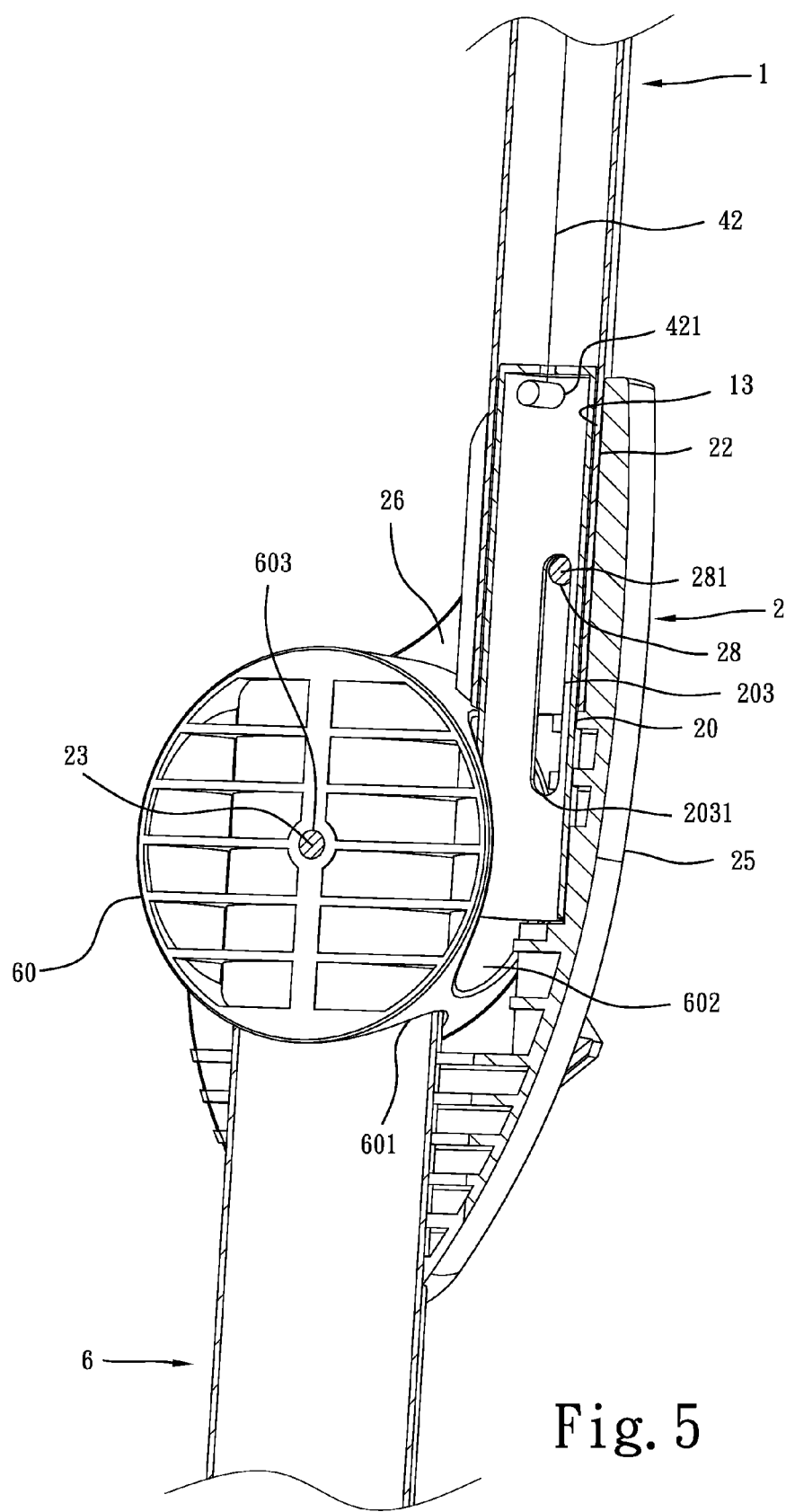
FIG. 5 is a sectional elevation in an enlarged scale of a part of the baby jogger in accordance with the present invention.
Figure 6:
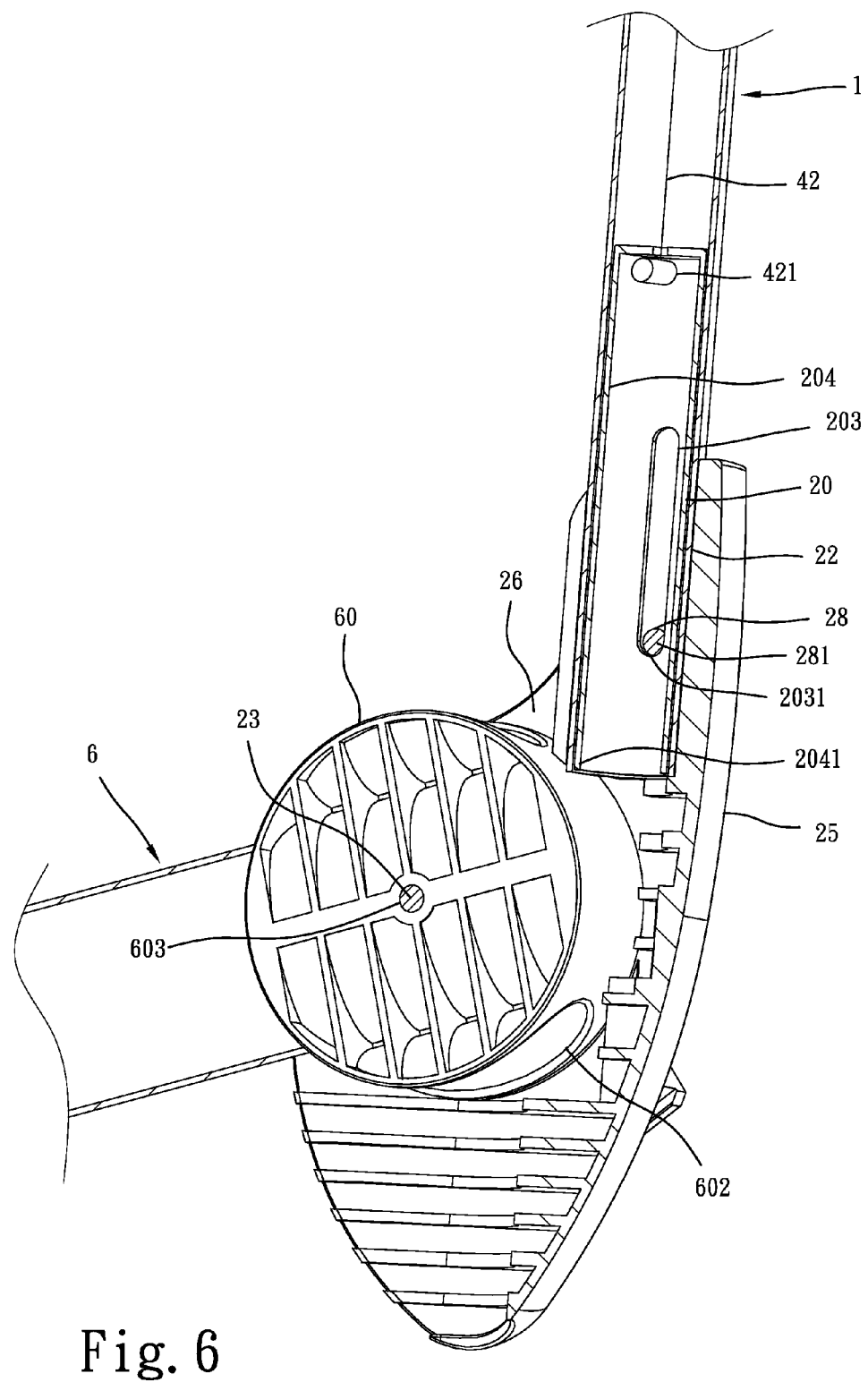
FIG. 6 corresponds to FIG. 5, illustrating the lower frame unit unlocked and biased relative to the upper frame unit.
Figure 7:
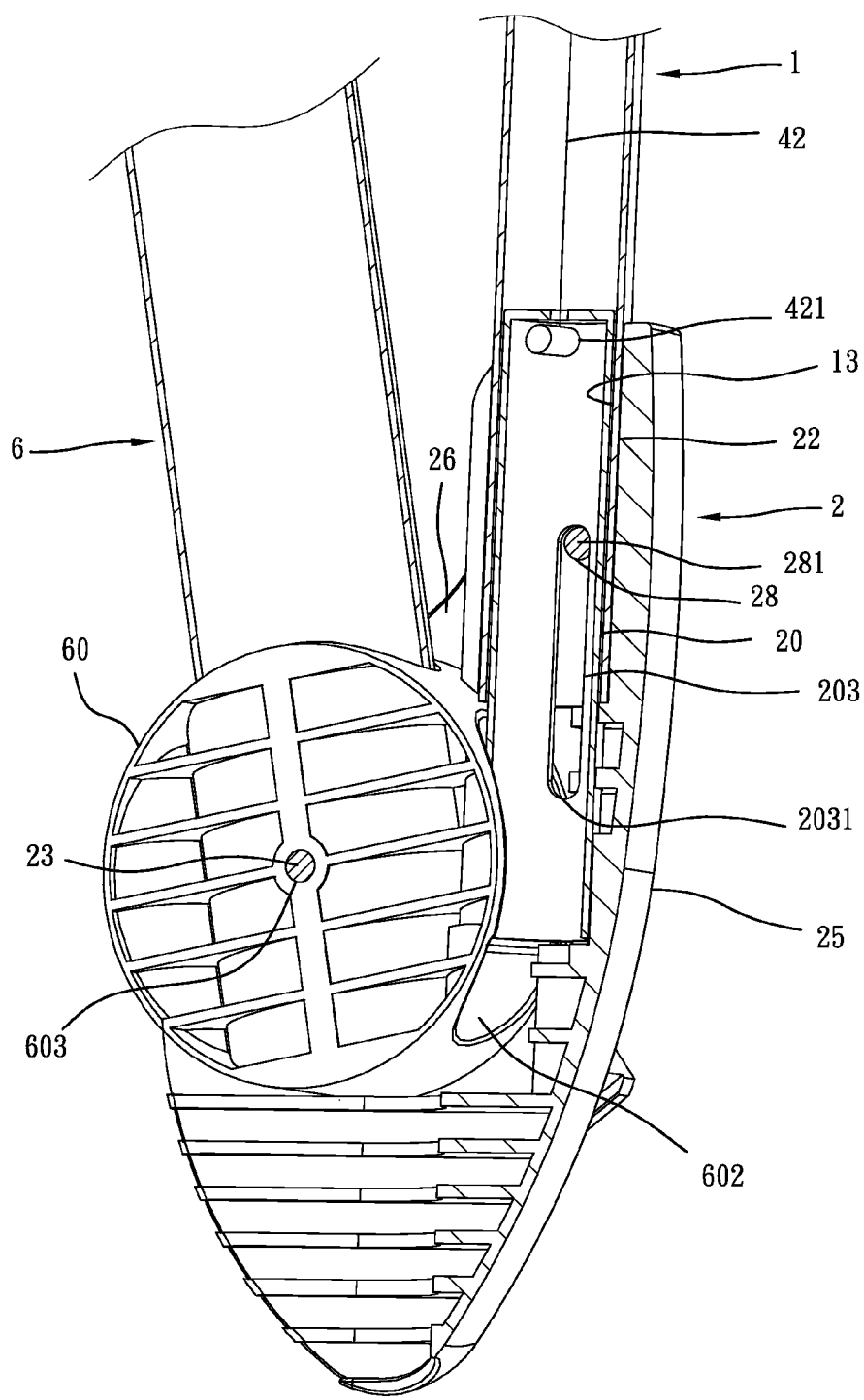
FIG. 7 corresponds to FIG. 6, illustrating the lower frame unit and the upper frame unit collapsed.
Figure 8:
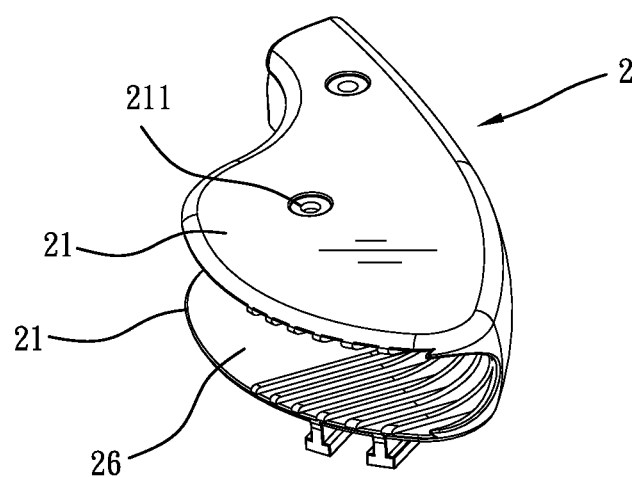
FIG. 8 is an elevational view of one coupling member for the baby jogger in accordance with the present invention.
Figure 9:
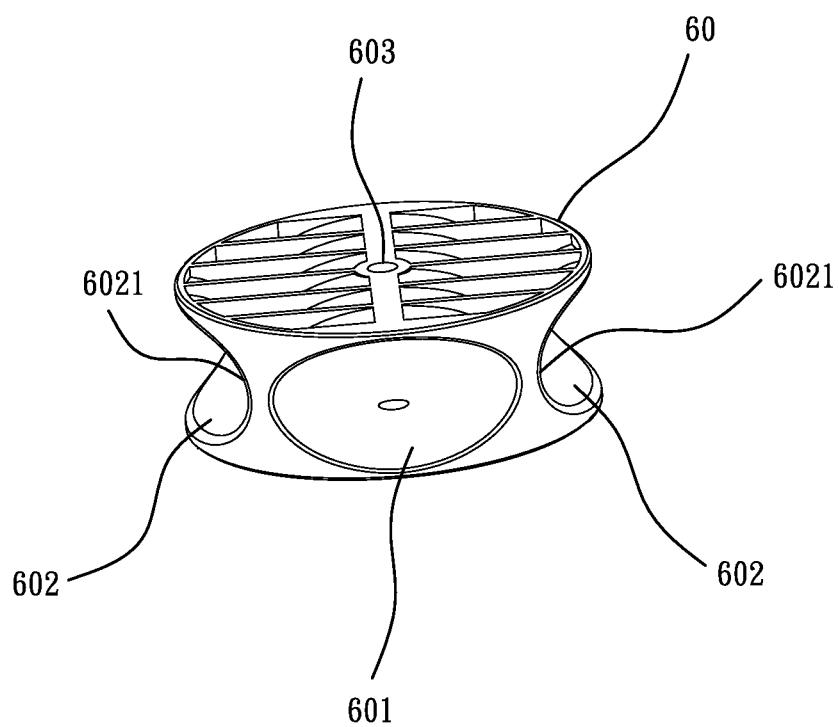
FIG. 9 is an elevational view of one rotary member for the baby jogger in accordance with the present invention.
Figure 10:
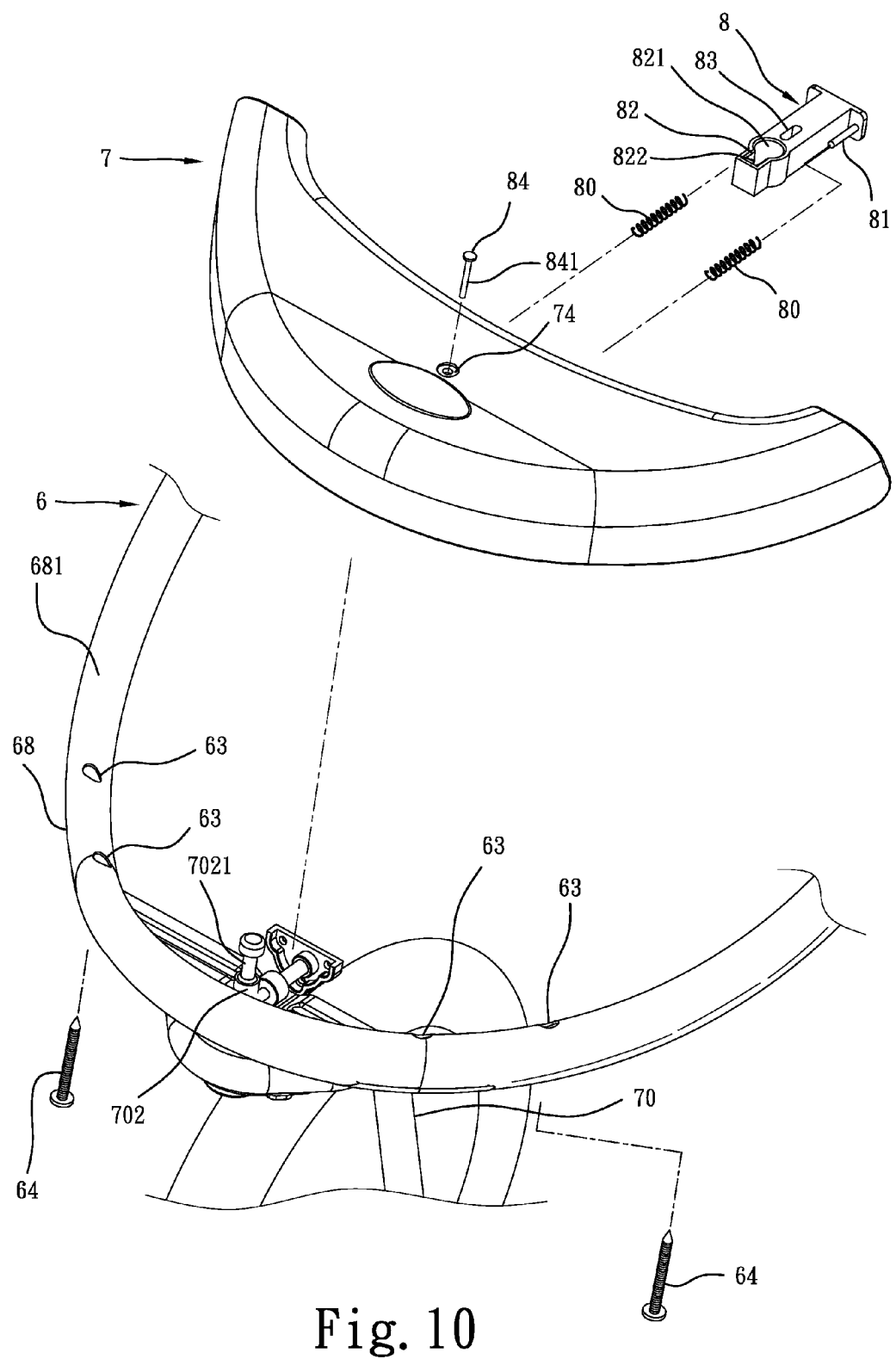
FIG. 10 is an exploded view of a part of the present invention, illustrating the relative arrangement of the lower frame unit, the mud fender and the control member.
Figure 11:
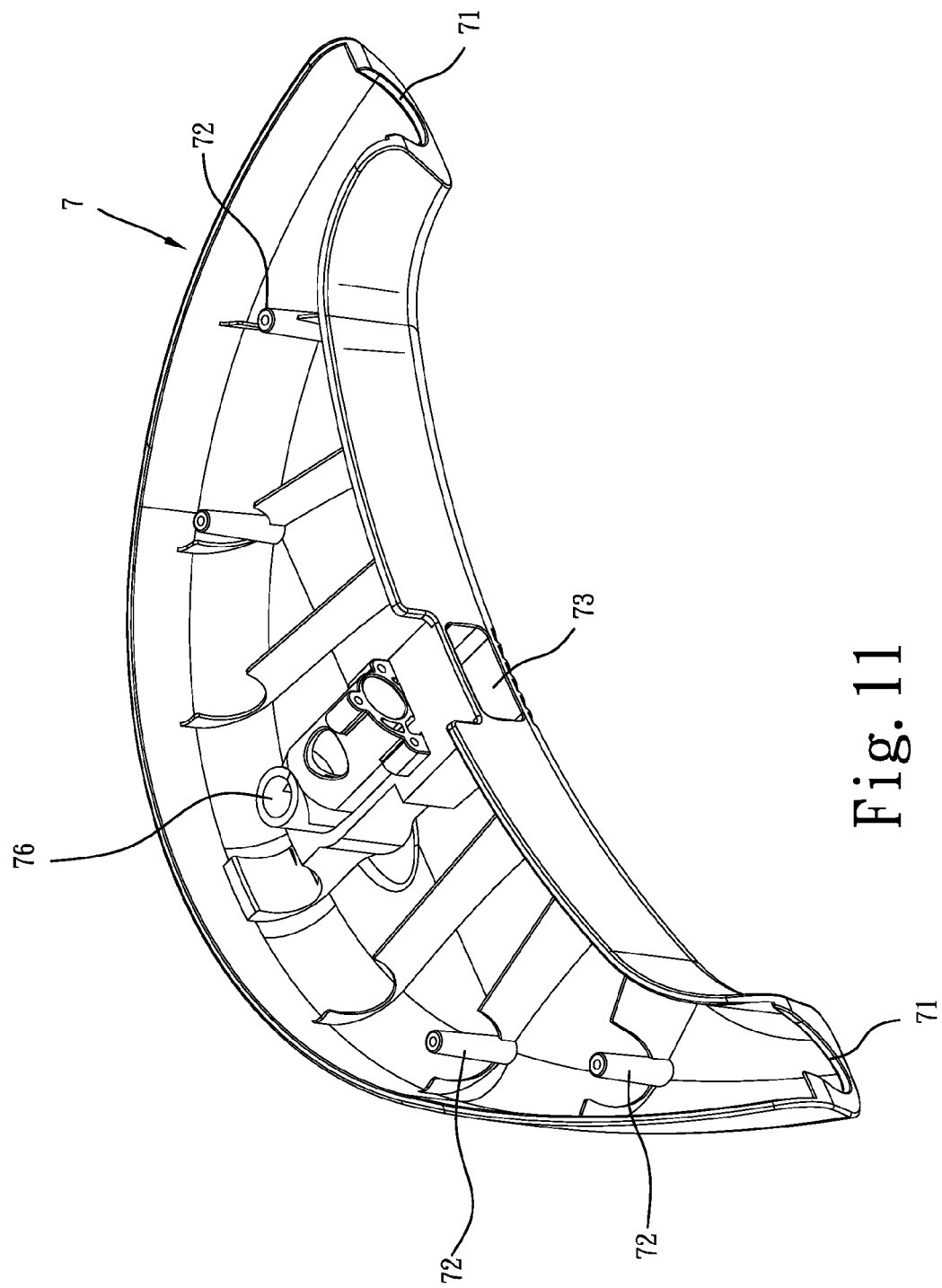
FIG. 11 is an oblique bottom view of the mud fender shown in FIG. 10.
Figure 12:
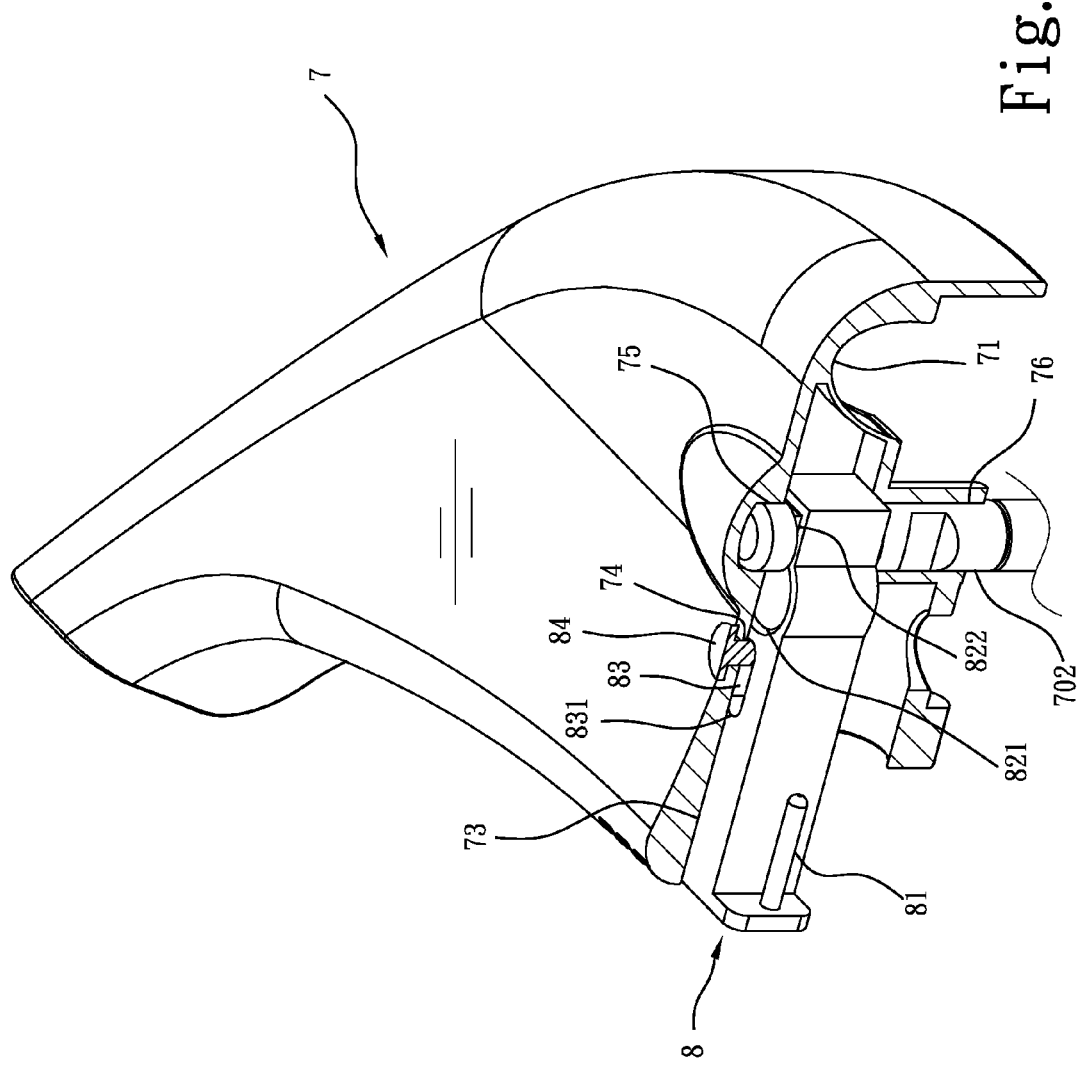
FIG. 12 is a sectional elevational assembly view of a part of the present invention, illustrating the arrangement of the mud fender, the control member and the mounting axle of the front wheel frame.
Figure 13:
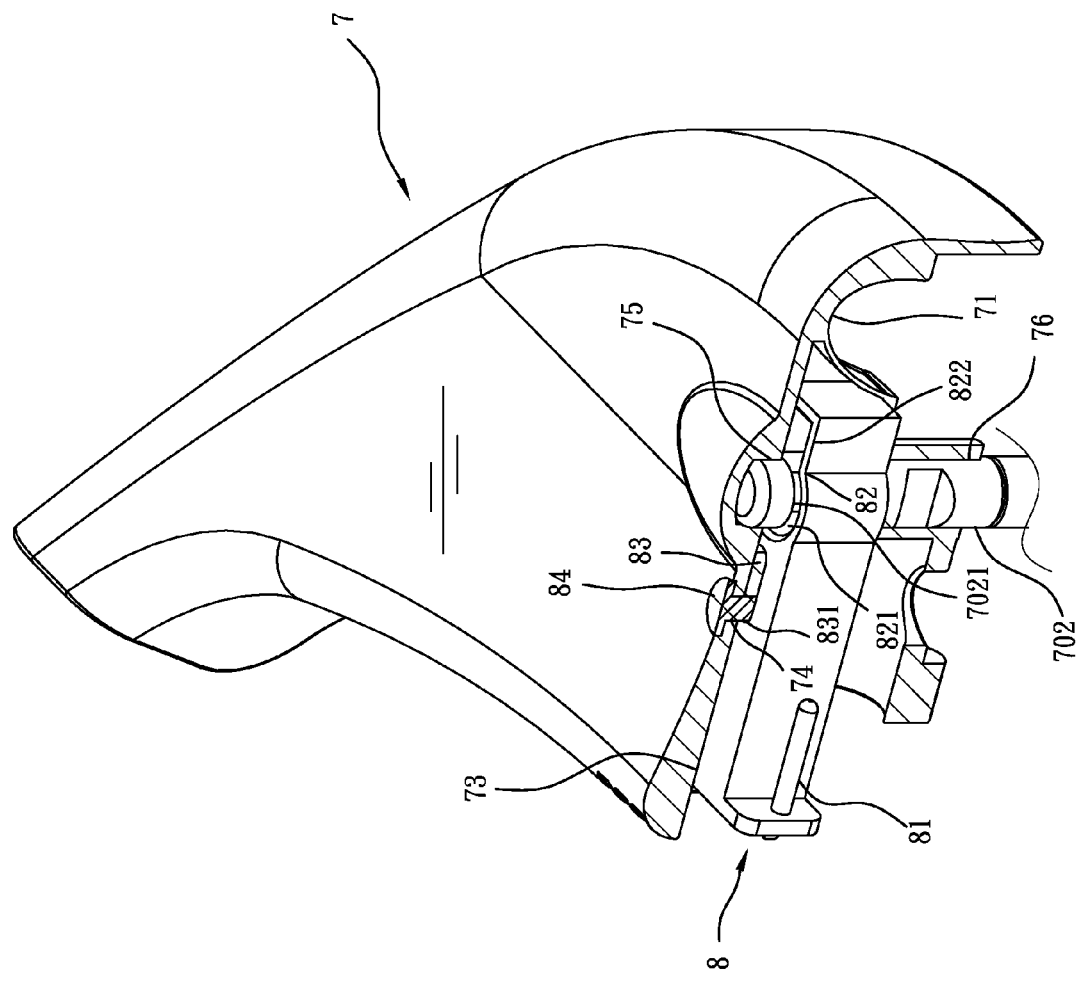
FIG. 13 corresponds to FIG. 12, illustrating the control member pressed by an external force.

Referring to FIGS. 2-14, a baby jogger in accordance with the present invention is shown comprising:

an upper frame unit 1, which comprises a tubular and substantially U-shaped handlebar 11, two connection members 12 bilaterally symmetrically mounted on the U-shaped handlebar 11 near the two distal ends 13 of the U-shaped handlebar 11;

two coupling members 2 respectively affixed to the two distal ends of the U-shaped handlebar 11 of the upper frame unit 1 with fastening members 28 (see FIG. 3), each comprising two sidewalls 21, a locating hole 22 defined in between the two sidewalls 21 at a top side (see FIGS. 4-7) for accommodating the two distal ends 13 of the U-shaped handlebar 11, a pivot hole 211 cut through each of the two sidewalls 21 (see FIGS. 3 and 4);

two stop members 20 movable up and down with one respective linking device 4;

two rear frame bars 3 each having a top end 31 respectively pivotally connected to the connection members 12 of the upper frame unit 1 and a bottom end 32 connectable to a rear wheel axle 30;

a rear wheel axle 30 having two connection portions 301 respectively extended from two distal ends thereof and respectively affixed to the bottom ends 32 of the rear frame bars 3;

a plurality of rear wheels 302 of size over 15 inches respectively pivotally mounted at the two distal ends of the rear wheel axle 30;

two linking devices 4 arranged at two opposite lateral sides of the upper frame unit 1, each linking device 4 comprising a linking member 41 supported on a spring member (not shown) and a rope 42 connected with the linking member 41 and having the other end 421 thereof affixed to one of the two stop members 20 (see FIGS. 4~7);

two side bars 5 each having a rear end 51 respectively pivotally connected to the two connection portions 301 of the rear wheel axle 30 and a front end 52 respectively pivotally connected to a lower frame unit 6;

a lower frame unit 6 made of a substantially U-shaped frame bar having the two distal ends 61 thereof respectively pivotally connected to the two coupling members 2 and pivotally connected with the pivot hole 211 on each of the two sidewalls 21 of the coupling members 2 by a pivot pin 23 (see FIGS. 3 and 4);

a mud fender 7 affixed to the middle part 68 of the U-shaped frame bar of the lower frame unit 6;

a front wheel frame 70 having a mounting axle 702 located on the top side thereof and pivotally connected to the mud fender 7 at the lower frame unit 6 and having an annular groove 7021 extending around the periphery thereof (see FIGS. 10, 12 and 13); and a front wheel of size over 12 inches pivotally supported on the front wheel frame 70.

The main features of the present invention are outlined hereinafter.

The stop members 20 are respectively inserted into the two distal ends 13 of the tubular U-shaped handlebar 11 of the upper frame unit 1, each having a longitudinal sliding slot 203 coupled to the shank 281 of the associating fastening member 28 (see FIGS. 3-7) so that the fastening members 28 limit the range of the upward and downward sliding movement of the stop members 20. Each stop member 20 has one sidewall portion 204 thereof for stopping a rotary member 60 at one end 61 of the lower frame unit 6 (see FIG. 4). When the stop member 20 is moved upwards with the respective linking device 4 to the position where the bottom end 2031 of the longitudinal sliding slot 203 is stopped by the shank 281 of the associating fastening member 28, the bottom end 2041 of one sidewall portion 204 is disengaged from the respective rotary member 60 of the lower frame unit 6 (see FIG. 6).

The two coupling members 2 each further comprise a front wall 25 connected between the two sidewalls 21 thereof and an accommodation space 26 surrounded by the front wall 25 and the sidewalls 21 and kept in communication with the bottom end of the locating hole 22 (see FIGS. 3~8).

The two distal ends 61 of the lower frame unit 6 are respectively and pivotally mounted with one respective rotary member 60 in the accommodation space 26 in each of the two coupling members 2. Each rotary member 60 comprises a center pivot hole 603 pivotally coupled to the pivot hole 211 on each of the two sidewalls 21 of each of the coupling members 2 and one of the two distal ends 61 of the lower frame unit 6 by a pivot pin 23, a coupling hole 601 coupled to one of the two distal ends 61 of the lower frame unit 6 (see FIGS. 3~7), two sector guide holes 602 disposed at two opposite lateral sides relative to the coupling hole 601, each sector guide hole 602 having an inside wall 6021 disposed adjacent to the sidewall portion 204 of the associating stop member 20 so that one sector guide hole 602 of each rotary member 60 is stoppable by the sidewall portion 204 of the associating stop member 20 (see FIGS. 4 and 5). The lower frame unit 6 further comprises a plurality of mounting holes 63 (see FIG. 10).

The mud fender 7 comprises a coupling groove 71 downwardly attached to the top edge 681 of the middle part 68 of the U-shaped frame bar of the lower frame unit 6 (see FIG. 10), a plurality of mounting posts 72 suspending in the coupling groove 71 and respectively inserted into the mounting holes 63 of the lower frame unit 6 and affixed thereto with fastening members 64, a rear opening 73 (see FIG. 11) and a through hole 74 in communication with the rear opening 73, and opposing first coupling hole 75 and second coupling hole 76 in communication with the rear opening 73 (see FIGS. 10~13), a stop wall 730 defined in the rear opening 73 (see FIG. 14). Further, a control member 8 is accommodated in the rear opening 73 of the mud fender 7. The control member 8 comprises two support rods 81 bilaterally disposed at a rear end thereof. Two spring members 80 respectively sleeved onto the support rods 81 of the control member 8 and inserted with the control member 8 into the rear opening 73 of the mud fender 7 and stopped against the stop wall 730. The control member 8 further comprises a positioning hole 82 disposed at a front end thereof, a sliding slot 83 spaced between the support rods 81 and positioning hole 82 and coupled to the through hole 74 of the mud fender 7 by a pivot pin 84. The pivot pin 84 has the pin body 841 thereof inserted through the sliding slot 83 of the control member 8. Thus, the control member 8 can be forced forwardly by an external force relative to the mud fender 7 to compress the spring members 80. When the external force is removed, the spring members 80 immediately return the control member 8 to its former position. The positioning hole 82 has a big diameter portion 821 and a small diameter portion 822. The small diameter portion 822 is disposed above the second coupling hole 76 of the mud fender 7 (see FIGS. 12 and 14). When the control member 8 is forced forwardly to compress the spring members 80 and reaches the position where the rear end 831 of the sliding slot 83 is stopped by the pin body 841 of the pivot pin 84, the big diameter portion 821 is kept in axial alignment with the second coupling hole 76 of the mud fender 7 (see FIG. 13). The diameter of the big diameter portion 821 is greater than the diameter of the mounting axle 702 of the front wheel frame 70. The diameter of the small diameter portion 822 is smaller than the diameter of the mounting axle 702 of the front wheel frame 70.

When jogging, the user can push the baby jogger on the road. When not in use, operate the linking members 41 of the linking devices 4 to pull the stop members 20 upwards relative to the lower frame unit 6 by means of the respective ropes 42 (see FIG. 4). When the longitudinal sliding slot 203 of each stop member 20 is stopped by the shank 281 of the associating fastening member 28, and the bottom end 2041 of one sidewall portion 204 of each stop member 20 is disengaged from one sector guide hole 602 of the associating rotary member 60 of the lower frame unit 6 (see FIG. 6), allowing the two distal ends 61 of the lower frame unit 6 to be moved with the respective rotary members 60 forwardly downwards to force the other sector guide hole 602 of each rotary member 60 of the lower frame unit 6 into engagement with the bottom end 2041 of the other sidewall portion 204 of the associating stop member 20 (see FIGS. 6 and 7), and therefore the baby jogger is collapsed.

As stated above, the front wall 25 of each coupling member 2 is connected between the two sidewalls 21 thereof; the rotary members 60 at the two distal ends 61 of the lower frame unit 6 are respectively accommodated in the accommodation space 26 in each of the two coupling members 2; the two distal ends 13 of the U-shaped handlebar 11 of the upper frame unit 1 are respectively accommodated in the locating hole 22 in each of the two coupling members 2. This arrangement avoids accidental finger jam when collapsing the upper frame unit 1 and the lower frame unit 6, assuring a high level of safety.

Further, during connecting the front wheel frame 70 to the mud fender 7, push the control member 8 forwardly to compress the spring members 80 and to have the rear end 831 of the sliding slot 83 of the control member 8 be stopped by the pivot pin 84 and the big diameter portion 821 of the positioning hole 82 be kept in axial alignment with the second coupling hole 76 of the mud fender 7 (see FIG. 13), and then insert the mounting axle 702 of the front wheel frame 70 upwardly in proper order into the second coupling hole 76 of the mud fender 7, the big diameter portion 821 of the positioning hole 82 and the first coupling hole 75 of the mud fender 7, and then release the hand from the control member 8, enabling the spring members 80 to push the control member 8 backwardly to its former position and to further force the small diameter portion 822 of the positioning hole 82 into engagement with the annular groove 7021 of the mounting axle 702 (see FIGS. 12 and 14), locking the insert the mounting axle 702 of the front wheel frame 70 to the mud fender 7.

In conclusion, the baby jogger has the advantages and features as follows:

1. The front wall 25 of each coupling member 2 is connected between the two sidewalls 21 thereof; the rotary members 60 at the two distal ends 61 of the lower frame unit 6 are respectively accommodated in the accommodation space 26 in each of the two coupling members 2 (see FIGS. 3-7); the two distal ends 13 of the U-shaped handlebar 11 of the upper frame unit 1 are respectively accommodated in the locating hole 22 in each of the two coupling members 2. This arrangement avoids accidental finger jam when collapsing the upper frame unit 1 and the lower frame unit 6, assuring a high level of safety.
2. The mud fender 7 is detachably mounted with the coupling groove 71 thereof to the lower frame unit 6 and affixed thereto with the fastening members 64, and the control member 8 is mounted with the spring members 80 in the rear opening 73 of the mud fender 7 and pivotally secured thereto by the pivot pin 84 for releasably locking the front wheel frame 70 to the mud fender 7, facilitating installation, saving much installation labor and time and eliminating any welding technique.
3. Subject to the mounting arrangement of the mud fender 7, the control member 8, the spring member 80 and the fastening members 64, the front wheel frame 70 can be fastened to or dismounted from the mud fender 7 conveniently.

What is claimed is:

1. A baby jogger, comprising:
   an upper frame unit comprising a tubular and substantially U-shaped handlebar, two connection members bilaterally symmetrically mounted on said U-shaped handlebar near two distal ends of said U-shaped handlebar;
   two coupling members respectively affixed to the two distal ends of said U-shaped handlebar of said upper frame unit with a respective fastening member, each said coupling member comprising two sidewalls, a locating hole defined in between the two sidewalls at a top side for accommodating the two distal ends of the U-shaped handlebar of said upper frame unit and a pivot hole cut through each of the two sidewalls;
   two stop members movable up and down with one respective linking device;
   two rear frame bars each having a top end respectively pivotally connected to the connection members of said upper frame unit and a bottom end connectable to a rear wheel axle;
   a rear wheel axle comprising two connection portions respectively extended from two distal ends thereof and respectively affixed to the bottom ends of said rear frame bars;
   a plurality of rear wheels respectively pivotally mounted at the two distal ends of said rear wheel axle;
   two linking devices arranged at two opposite lateral sides of said upper frame unit, each said linking device comprising a linking member and a rope having one end thereof connected with said linking member and an opposite end thereof affixed to one of said two stop members;
   two side bars, each said side bar comprising a rear end respectively pivotally connected to the two connection portions of said rear wheel axle and a front end respectively pivotally connected to a lower frame unit;
   the lower frame unit made of a substantially U-shaped frame bar and having two distal ends thereof respectively pivotally connected to said two coupling members and pivotally connected with the pivot hole on each of the two sidewalls of said coupling members by a pivot pin;
   a mud fender mounted at a middle part of the U-shaped frame bar of said lower frame unit;
   a front wheel frame comprising a mounting axle extended from a top side thereof and pivotally connected to said mud fender at said lower frame unit, said mounting axle comprising an annular groove extending around the periphery thereof; and
   a front wheel pivotally supported on said front wheel frame;
   wherein:
   said stop members are respectively inserted into the two distal ends of the tubular U-shaped handlebar of said upper frame unit, each comprising a longitudinal sliding slot respectively coupled to the fastening members at said coupling members so that the fastening members limit the range of upward and downward sliding movement of said stop members, and opposing sidewall portions for stopping a rotary member at each of the two distal ends of said lower frame unit;
   said two coupling members each further comprise a front wall connected between the two sidewalls thereof and an accommodation space surrounded by the front wall and the sidewalls and kept in communication with a bottom end of the locating hole thereof;
   the two distal ends of said lower frame unit are respectively and pivotally mounted with one respective rotary member in the accommodation space in each of said two coupling members by the pivot pin in the pivot hole on each of the two sidewalls of each of said coupling members, a coupling hole coupled to one of the two distal ends of said lower frame unit, two sector guide holes disposed at two opposite lateral sides relative to the coupling hole, each said sector guide hole defining an inside wall disposed adjacent to one sidewall portion the associating stop member so that one sector guide hole of each said rotary member is stoppable by one sidewall portion of the associating stop member;
   said lower frame unit further comprises a plurality of mounting holes;
   said mud fender comprises a coupling groove downwardly attached to the middle part of the U-shaped frame bar of said lower frame unit, a plurality of mounting posts suspending in said coupling groove and respectively inserted into the mounting holes of said lower frame unit and affixed thereto with fastening members, a rear opening and a through hole in communication with said rear opening, opposing first coupling hole and second coupling hole in communication with said rear opening, and a stop wall defined in said rear opening;

a control member is accommodated in said rear opening of said mud fender, said control member comprising two support rods bilaterally disposed at a rear end thereof, two spring members respectively sleeved onto said support rods and inserted with said control member into said rear opening of said mud fender and stopped against the stop wall of said mud fender, a positioning hole disposed at a front end thereof, a sliding slot spaced between the support rods and positioning hole and coupled to the through hole of said mud fender by a pivot pin, said pivot pin comprising a pin body inserted through the sliding slot of said control member so that said control member is movable forwardly by an external force relative to said mud fender to compress said spring members and returnable to a former position by said spring members when the external force is removed, said positioning hole comprising a big diameter portion and a small diameter portion, said small diameter portion being disposed above said second coupling hole of said mud fender, said big diameter portion being kept in axial alignment with said second coupling hole of said mud when said control member is forced forwardly to compress said spring members and reaching the position where one end of said sliding slot of said control member is stopped by the pin body of said pivot pin.

2. The baby jogger as claimed in claim 1, wherein the diameter of said big diameter portion is greater than the diameter of the mounting axle of said front wheel frame; the diameter of said small diameter portion is smaller than the diameter of said mounting axle of said front wheel frame.

3. The baby jogger as claimed in claim 1, wherein each said rotary member comprises a pivot hole disposed at a center and respectively pivotally coupled to the pivot pin in the pivot hole on each of the two sidewalls of each of said coupling members.

\* \* \* \* \*